(12) United States Patent
Cantwell et al.

(10) Patent No.: US 6,370,155 B1
(45) Date of Patent: Apr. 9, 2002

(54) HIGH DENSITY UNIT SHELF NETWORK INTERFACE CARD AND METHOD

(75) Inventors: Robert W. Cantwell, Garland; Michael H. Jette, Grapevine, both of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/001,375

(22) Filed: Dec. 31, 1997

Related U.S. Application Data

(63) Continuation-in-part of application No. 08/911,305, filed on Aug. 14, 1997, now Pat. No. 5,982,744.

(51) Int. Cl.[7] .............................. H04J 3/16; H04L 12/28
(52) U.S. Cl. ........................ 370/465; 466/467; 466/907
(58) Field of Search ................................. 370/355, 356, 370/357, 359, 366, 370, 386, 419, 465, 463, 477, 466, 907, 543, 438, 467

(56) References Cited

U.S. PATENT DOCUMENTS

| | | | | |
|---|---|---|---|---|
| 5,007,013 A | * | 4/1991 | Elms ........................... | 370/438 |
| 5,577,042 A | * | 11/1996 | McGraw, Sr. et al. ...... | 370/257 |
| 5,784,377 A | * | 7/1998 | Baydar et al. .............. | 370/463 |
| 6,002,692 A | * | 12/1999 | Wills ........................... | 370/465 |

OTHER PUBLICATIONS

Peter Newman, "ATM Technology for Corporate Networks", IEEE Communications Magazine, Apr. 1992, pp 90–101.*
Peter Newman, ATM Technology for Corporate Networks, pp. 95, Apr. 1992.*
Advertisement, Alcatel Telecom Products & Networks "1630 SX Narrowband Cross Connect" 1 page from World Wide Web Site at www.alcatel.com.

* cited by examiner

Primary Examiner—Alpus H. Hsu
Assistant Examiner—Afsar M. Qureshi
(74) Attorney, Agent, or Firm—Baker Botts L.L.P.

(57) ABSTRACT

A network interface card (100) includes a line interface unit (102) operable to receive inbound network telecommunications signals having one of a plurality of first formats. A transceiver framer unit (104) converts the inbound network telecommunications signals from the first format to a second format. A matrix interface unit (106) transports the inbound network telecommunications signals having the second format to a pair of redundant switching matrix planes (A, B). The matrix interface unit (106) also receives outbound, network telecommunications signals having the second format from the redundant switching planes (A, B) for transport to the transceiver framer unit (104). The transceiver framer unit (104) converts the outbound network telecommunications signals from the second format to an appropriate first format for transport to network elements through the line interface unit (102).

20 Claims, 4 Drawing Sheets

FIG. 5

HIGH DENSITY UNIT SHELF NETWORK INTERFACE CARD AND METHOD

CROSS REFERENCE TO RELATED APPLICATIONS

This application is a continuation-in-part application of U.S. application Ser. No. 08/911,305 filed Aug. 14, 1997, now U.S. Pat. No. 5,982,744 issued Nov. 9, 1999.

TECHNICAL FIELD OF THE INVENTION

This invention relates in general to the field of telecommunications and more particularly to a high density unit shelf network interface card and method of operation.

BACKGROUND OF THE INVENTION

The demand for high capacity and reliable telecommunications networks continues to grow as network and service providers upgrade their networks to provide more and increasingly advanced telecommunications services. In particular, the demand for high capacity and reliable digital cross-connect systems continues to grow. A digital cross-connect system is a specialized type of high-speed digital data and voice channel switch that is partitioned using specific instructions or commands that are separate from the normal signaling network and independent of any information that may flow through the cross-connect system. Reliability and availability are of paramount importance in these systems.

Unfortunately, digital cross-connect systems are often inflexible and have a limited line capacity that is difficult to increase or expand. This presents problems as a telecommunications network expands and the line capacity of the existing digital cross-connect system is met or exceeded. Generally, a telecommunications network designer or planner has no choice but to either replace the existing digital cross-connect system with an entirely new system, having a greater capacity, or to buy an additional digital cross-connect system to work in tandem with the existing digital cross-connect system. Both of these options are expensive, time consuming to install and administer, and often cause an interruption in service. Furthermore, there are often physical space limitations that prevent the location of additional telecommunications hardware such as a digital cross-connect system. As a result, the incremental cost to upgrade a telecommunications system far exceeds any immediate or near-term incremental revenues that will be realized to offset the upgrade cost.

Inflexible digital cross-connect systems present problems when maintenance is needed on the network interface card of a particular circuit or connection. The maintenance of the network interface card often makes the particular circuit or connection unavailable which reduces the overall availability of the circuit or connection.

SUMMARY OF THE INVENTION

From the foregoing it may be appreciated that a need has arisen for a high density unit shelf network interface card and method of operation that significantly increases the capacity of an existing digital cross-connect system without having to install an entirely new cross-connect system while improving overall system reliability and availability. In this manner, as the demand for high capacity and reliable telecommunications systems grows, existing digital cross-connect systems may easily and conveniently grow accordingly. Incremental upgrade costs can be minimized and will more closely track incremental increases in revenue as new services and users are added to the telecommunications network. In accordance with the present invention, there is provided a network interface card for a high density unit shelf that substantially eliminate and reduce the disadvantages and problems associated with expanding the capacity of a digital cross-connect system.

According to an aspect of the present invention, a network interface card is provided for use with a digital cross-connect system that includes an inbound processing circuit operable to process an inbound telecommunications signal having a first format into an inbound telecommunications signal having a second format. Also included is an outbound processing circuit operable to process an outbound telecommunications signal having the second format into an outbound telecommunications signal having the first format.

The present invention provides a multitude of technical advantages. One technical advantage of the present invention includes the capability to easily and inexpensively upgrade the capacity of an existing digital switch, such as a digital cross-connect system, while increasing overall system reliability and availability. The reliability and availability are increased by providing physically redundant paths for inbound telecommunications signals and outbound telecommunications signals while providing a path for information to be exchanged between the two network interface ports of each network interface port pair. Another technical advantage of the present invention includes the flexibility to configure the high density unit shelf in such a manner as to minimize incremental costs as the capacity of the associated digital cross-connect system expands. Yet another technical advantage includes the capability to interface network signals provided at a variety of different signal formats and rates to the digital cross-connect system using the high density unit shelf of the present invention. Still yet another technical advantage of the present invention includes the capability to operate in either a redundant mode or a non-redundant mode. Yet another technical advantage includes the capability to upgrade the capacity of a digital switch, such as a digital cross-connect system, with a high density unit shelf that consumes minimal floor space. Another technical advantage of the present invention includes the capability to keep a circuit or connection in service while performing maintenance on the network interface card of the circuit or connection while still maintaining the circuit or connection in service, thus significantly increasing overall availability and reliability. Other technical advantages may be readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 5 is a block diagram illustrating a high density unit shelf network interface card;

DETAILED DESCRIPTION OF THE INVENTION

Figure 1:
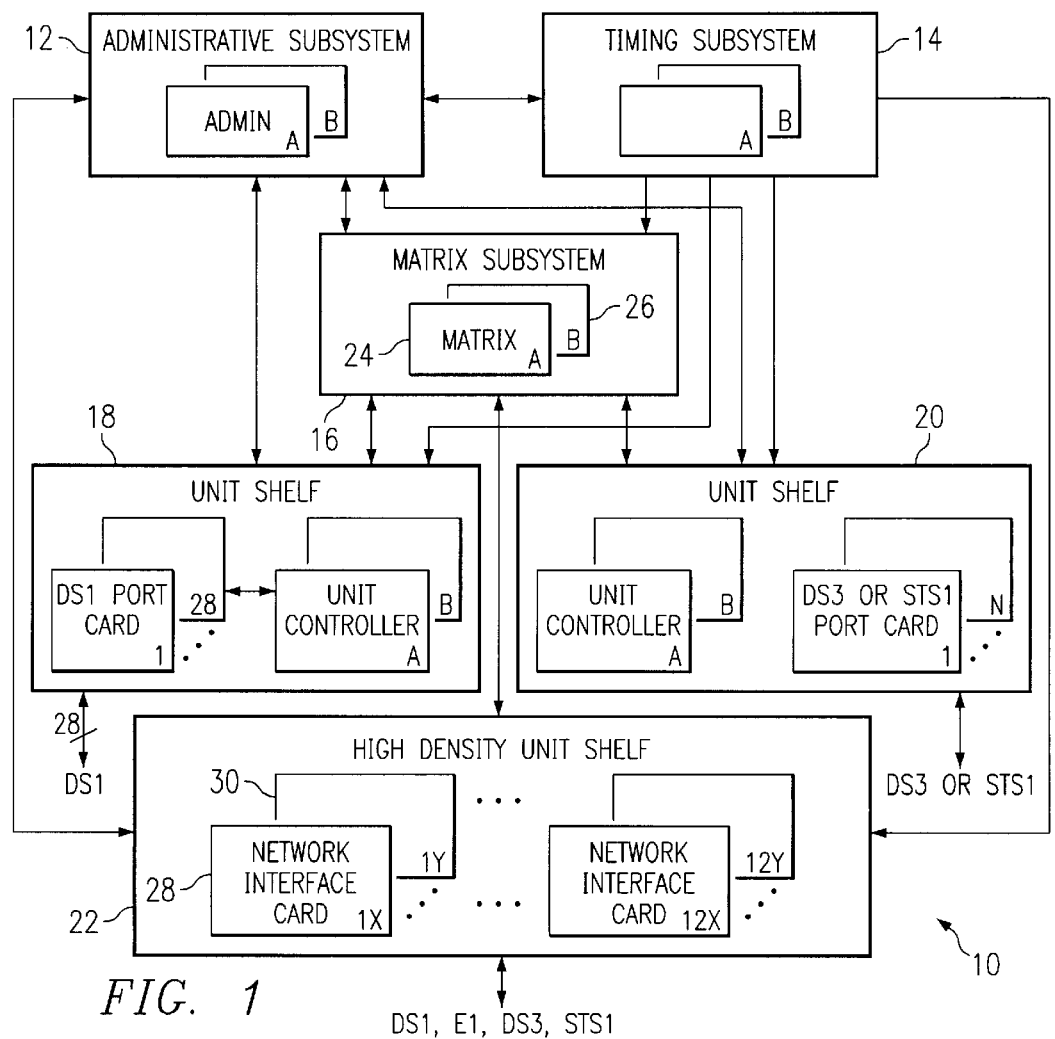
FIG. 1 is an overview diagram illustrating an exemplary digital cross-connect system of a telecommunications network.

FIG. 1 is an overview diagram illustrating an exemplary digital cross-connect system 10 of a telecommunications network. Digital cross-connect system 10 may receive, switch, and communicate digital telecommunications signals in any of a variety of a different formats such as the digital signal, level one (DS1) format; the digital signal, level three (DS3) format; the E-1 format; and the synchronous transport signal level one (STS-1) format. Internally, digital cross-connect system 10 performs digital switching at the digital signal, level zero (DS0) rate or format. Digital cross-connect system 10 includes various subsystems and unit shelves such as an administrative subsystem 12, a timing subsystem 14, a matrix subsystem 16, a unit shelf 18, a unit shelf 20, and a high density unit shelf 22. Unit shelf 18, unit shelf 20 and high density unit shelf 22 couple through their respective port cards or network interface cards to individual telecommunications networks or subnetworks so that inbound telecommunications signals may be received by digital cross-connect system 10 from these networks and so that outbound telecommunications signals may be communicated by digital cross-connect system 10 to these networks.

Generally, the administrative subsystem 12 includes redundant administrative subsystems A and B that are used to control the overall operation and configuration of digital cross-connect system 10. Each administrative subsystem will generally include a microprocessor and will function as a computer to control the operation of digital cross-connect system 10. For example, administrative subsystem 12 exchanges redundant control signals with unit shelf 18, unit shelf 20, and high density unit shelf 22 so that the various port cards, unit controllers, and network interface cards can be properly configured by administrative subsystem 12. The redundant configuration of administrative subsystem 12 results in increased overall system reliability and availability.

Administrative subsystem 12 performs operation, administration, maintenance, and provisioning (OAM&P) functions for digital cross-connect system 10. In this manner, an operator of digital cross-connect system 10 may configure the system using a terminal provided from administrative subsystem 12. For example, a craftsperson or operator may access a terminal of administrative subsystem 12 and provide provisioning information so that certain ports are connected to other ports to provided dedicated or provisioned communications paths. In this manner, administrative subsystem 12 sends control and provisioning information to the various unit shelves as needed to properly configure the various port cards, unit controllers, and network interface cards to provision desired inter-connections.

Administrative subsystem 12 also exchanges control information with matrix subsystem 16 to assist with the actual switching operations. Matrix subsystem 16 includes a redundant switching fabric that includes a switching fabric 24 and a switching fabric 26. Switching fabric 24 may be referred to as a first matrix and switching fabric 26 may be referred to as a second matrix. This redundant switching fabric enhances the overall reliability and availability of digital cross-connect system 10. Matrix subsystem 16 provides point-to-point connectivity and point-to-multipoint connectivity while performing switching at the DS0 rate or format. Timing subsystem 14 provides redundant timing signals to the various components of digital cross-connect system 10, including administrative subsystem 12. The redundant timing signals enhance overall system reliability and availability.

Unit shelf 18, in the one embodiment illustrated in FIG. 1, allows up to twenty-eight DS1 port cards to be included so that twenty-eight DS1 signals may be exchanged with associated networks and subnetworks and digital cross-connect system 10. Each port card of unit shelf 18 can convert the telecommunications signals between the DS1 format and a corresponding format, such as a proprietary format, compatible with digital cross-connect system 10. In one embodiment, the proprietary format provides information at the DS0 rate so that the information or telecommunications signal can be switched using matrix subsystem 16 and communicated to a port card or network interface card of one of the unit shelves of digital cross-connect system 10 as an outbound telecommunications signal. The proprietary format may be any available format such as the proprietary format used in DSC digital cross-connect systems. The proprietary format used in these systems provides the information at a DS0 rate so that matrix subsystem 16 may appropriately switch the signal.

Unit shelf 18, through its various port cards, may receive an inbound telecommunications signal in the DS1 format from an associated network, convert the inbound telecommunications signal to a proprietary format, as mentioned above, and communicate the inbound telecommunications signal to matrix subsystem 16 for switching. Unit shelf 18 may also receive an outbound telecommunications signal in the proprietary format from matrix subsystem 16, convert the outbound telecommunications signal to the DS1 format, and communicate the outbound telecommunications signal to an associated network or subnetwork coupled to unit shelf 18. This operation is controlled by redundant unit controllers, as shown in FIG. 1.

Unit shelf 20 functions similarly to unit shelf 18 except that unit shelf 20, in the embodiment shown in FIG. 1, provides interfaces at either the DS3 format or the STS-1 format so that higher rate and differently formatted telecommunications signals may be exchanged with digital cross-connect system 10. Unit shelf 20 includes redundant unit controllers and a plurality of port cards as illustrated. The port cards may be provided as either DS3 or STS-1 port cards. In this manner, either a DS3 or an STS-1 formatted inbound telecommunications signal may be received at a corresponding port card of unit shelf 20 and converted to the proprietary format so that the information of the inbound telecommunications signal may be provided at the DS0 rate to matrix subsystem 16 for switching. Similarly, an outbound telecommunications signal may be received at unit shelf 20 from matrix subsystem 16 in the proprietary format and converted to either the DS3 or the STS-1 format so that the outbound telecommunications signal may be provided to the attached network. The operation of unit shelf 20 is controlled by the redundant unit controllers.

High density unit shelf 22 provides the capability to use a variety of different network interface cards to redundantly exchange telecommunications signals with digital cross-connect system 10 in a variety of different formats such as the DS1, E1, DS3, and STS-1 formats. For example, an E1 network interface card may receive an inbound telecommunications signal from an attached network in the E1 format, convert the inbound telecommunications signal to the proprietary format used by matrix subsystem 16, and communicate the inbound telecommunications signal to matrix subsystem 16. Conversely, the E1 network interface card may receive an outbound telecommunications signal from matrix subsystem 16 in the proprietary format, convert the outbound telecommunications signal to the E1 format, and communicate the outbound telecommunications signal to the attached network. Note that high density unit shelf 22 does not use or need separate unit controller cards or circuitry such as those used in unit shelf 18 and unit shelf 20.

The architecture of high density unit shelf 22 is such that a large number of high rate telecommunications signals may be exchanged with digital cross-connect system 10 as compared with unit shelf 18 and unit shelf 20, hence the label "high density." Furthermore, high density unit shelf 22 occupies the same or less physical space than either unit shelf 18 or unit shelf 20 while providing the capability to exchange much larger amounts of information with digital cross-connect system 10.

High density unit shelf 22, illustrated more fully in FIGS. 2 through 4 and described more fully below, includes a plurality of network interface port pairs that includes a first network interface port and a second network interface port located adjacent to one another. Each network interface port pair couples through a network connector to exchange telecommunications signals with an associated network and a matrix connector to exchange telecommunications signals with switching fabric 24 and switching fabric 26 of matrix subsystem 16. The matrix connector may be implemented as a first and a second matrix connector.

The first network interface port of each network interface port pair may receive a first network interface card, and the second network interface port of each network interface port pair may receive a second network interface card. The first network interface card and the second network interface card of a particular network interface port pair will be identical or redundant network interface cards that generally may be interchanged with each other and are used to redundantly process both inbound and outbound telecommunications signals. For example, a network interface card 28 is provided and is illustrated with the designation "1X" because of its position in a first network interface port. Similarly, a network interface card 30 is shown and is illustrated with the designation "1Y" because of its position in a second network interface port. In this manner, high density unit shelf 22 may be populated with a plurality of network interface card pairs that are provided in a first network interface port, such as network interface card 28, and a second network interface port, such as network interface card 30, that increases overall system reliability and availability. Any number of network interface card port pairs may be provided in high density unit shelf 22 such as the twelve network interface card pairs illustrated in FIG. 1.

It should be noted that each of the network interface cards of high density unit shelf 22 will include processing circuitry and control circuitry such that high density unit shelf 22 does not need an associated unit controller card to control the flow and conversion of inbound and outbound telecommunications signals through the various network interface cards of high density unit shelf 22. In this manner, the reliability and availability of high density unit shelf 22 is increased as processing capability is distributed more evenly without the need to rely on a single or redundant unit controller.

High density unit shelf 22 may be configured in either a redundant configuration, a non-redundant configuration, or a combination thereof. The redundant configuration increases overall reliability and availability by providing two identical or redundant network interface cards to process the same inbound and outbound telecommunications signals in parallel Compared to the non-redundant configuration, the redundant configuration increases overall costs because of the need for two network interface cards, yet, in some applications, the increased reliability and availability are so critical that the only available option is the redundant configuration. The redundant configuration is illustrated more fully in FIG. 2.

However, certain telecommunications customers may not demand or require the increased reliability and availability offered by the redundant configuration and may prefer the less expensive non-redundant configuration. The non-redundant configuration provides a single network interface card per network interface port pair and hence is less expensive than operating in the redundant configuration. In this manner, only a single network interface card is needed and one port of the network interface port pair is left "open" without a network interface card. In this manner, the open port allows a spare network interface card to be utilized when work or maintenance is needed on the single network interface card with little or no interruption in service. The single network interface card may be provided in either the first network interface port or the second network interface port of the network interface port pair. The non-redundant configuration is discussed more fully below in connection with FIG. 3.

Finally, high density unit shelf 22 may operate in both the redundant and non-redundant configuration. For example, some network interface port pairs may include two network interface cards and hence operate in the redundant configuration while other network interface port pairs may include only a single network interface card and hence operate in the non-redundant configuration. In this manner, high density unit shelf 22 provides great flexibility in meeting various customer's needs by providing the level of service and reliability desired by the customer. Thus, high density unit shelf 22 provides a flexible configuration that allows a telecommunications provider to provide different levels of service to different types of customers. This allows incremental costs to more closely match incremental revenues.

Figure 2:
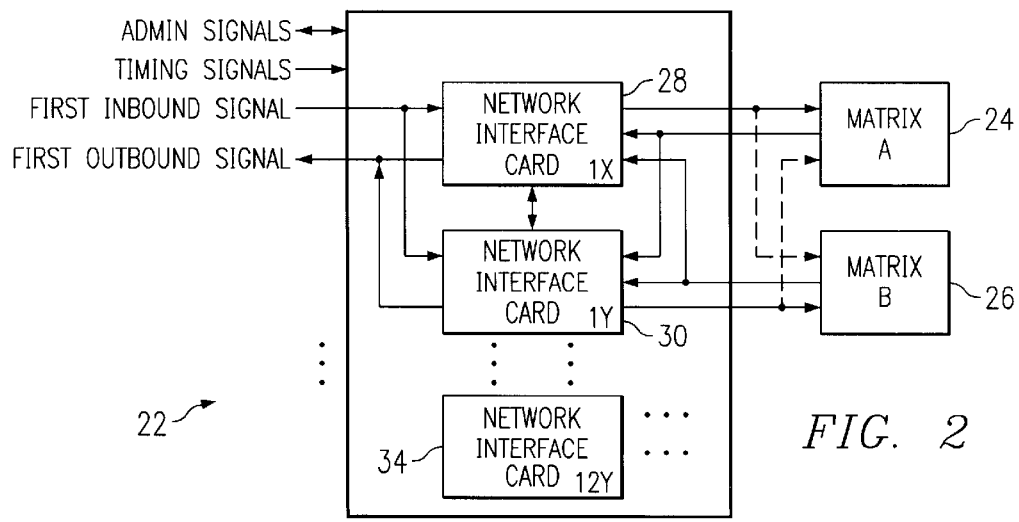
FIG. 2 is an overview block diagram illustrating a high density unit shelf having network interface cards provided in a redundant configuration.

FIG. 2 is an overview block diagram illustrating high density unit shelf 22 with network interface card 28 and network interface card 30 provided in a network interface port pair for redundantly processing an inbound telecommunications signal and an outbound telecommunications signal. The first network interface port is designated at "1X" and the second network interface port is designated as "1Y." High density unit shelf 22 is provided between digital cross-connect system 10 and various telecommunications networks or subnetworks that are coupled to redundant network interface cards such as network interface card 28 and network interface card 30. These various telecommunications networks are not shown in FIG. 2.

High density unit shelf 22 may include any number of additional network interface port pairs for receiving network interface cards and for providing redundant network interfacing. However, for purposes of illustration and discussion, the network interface port pair providing the redundant configuration of network interface card 28 and network interface card 30 is illustrated and discussed as an exemplary network interface port pair configured in a redundant configuration.

As discussed above, high density unit shelf 22 receives redundant control signals from administrative subsystem 12 which can be denoted as "ADMIN SIGNALS" as shown in FIG. 2. These ADMIN SIGNALS are provided throughout high density unit shelf 22 including each network interface port of each of the plurality of network interface port pairs. Similarly, redundant timing signals are provided to high density unit shelf 22 from timing subsystem 14. The timing signals are also provided to each of the various network interface ports of each of the plurality of network interface port pairs. For clarity, the network connectors and matrix connectors of high density unit shelf 22 are not illustrated in FIG. 2 but will normally be provided in an actual implementation of high density unit shelf 22. These connectors are illustrated in FIG. 4 and discussed more fully below.

In operation, the redundant network interface configuration shown in FIG. 2 receives a first inbound telecommunications signal from an attached network at both network interface card 28 and network interface card 30. Each of these network interface cards processes the inbound telecommunications signal and converts it from a first format to a second format, such as a proprietary format, understandable by digital cross-connect system 10 and used by matrix subsystem 16 for switching. The first format may be any of a variety of available digital communications signal formats such as the DS1, E1, DS3, and STS-1 formats. After processing and converting the first inbound telecommunications signal, network interface card 28 provides its output signal to switching fabric 24. Similarly, network interface card 30 provides its output to switching fabric 26. The dashed lines provided at the output of both network interface card 28 and network interface card 30 indicate that high density unit shelf 22 provides paths from each network interface port to both switching fabric 24 and switching fabric 26. This provides additional redundancy and allows either network interface card 28 or network interface card 30 to drive both switching fabric 24 and switching fabric 26 in the event that one of the cards is unavailable or out of service.

When processing an outbound telecommunications signal, both network interface card 28 and network interface card 30 receive an outbound telecommunications signal from both switching fabric 24 and switching fabric 26. Each of these outbound telecommunications signals may also include other information such as parity information and other information that indicates the quality of the provided outbound telecommunications signal. The quality indication information may then be used by each of the network interface cards to decide which outbound telecommunications signal should be processed, converted, and communicated as a first outbound telecommunications signal as illustrated in FIG. 2. Both network interface card and network interface card 30 decide which of the input outbound telecommunications signals to process. Once chosen, each network interface card converts the chosen outbound telecommunications signal from the second format to the first format and generates a first outbound telecommunications signal. At this point, either network interface card 28 or network interface card 30 will be designated as the primary or active card that will provide its output as the first outbound telecommunications signal that is then provided to the coupled or attached network. This decision may be made either locally at network interface card 28 and network interface card 30 or by the administrative subsystem 12 through the redundant control signals provided to each network interface control port pair.

As illustrated in FIG. 2, each network interface port of the illustrated network interface port pair are coupled to one another so that network interface card 28 and network interface card 30 may exchange information as needed. For example, network interface card 28 may provide control or administrative signals to network interface card 10 through this direct connection. This would be especially beneficial if for some reason network interface card 30 was unable to directly receive the control signals from administrative subsystem 12. In this manner, the overall reliability and availability of high density unit shelf 22 is further enhanced.

Figure 3:
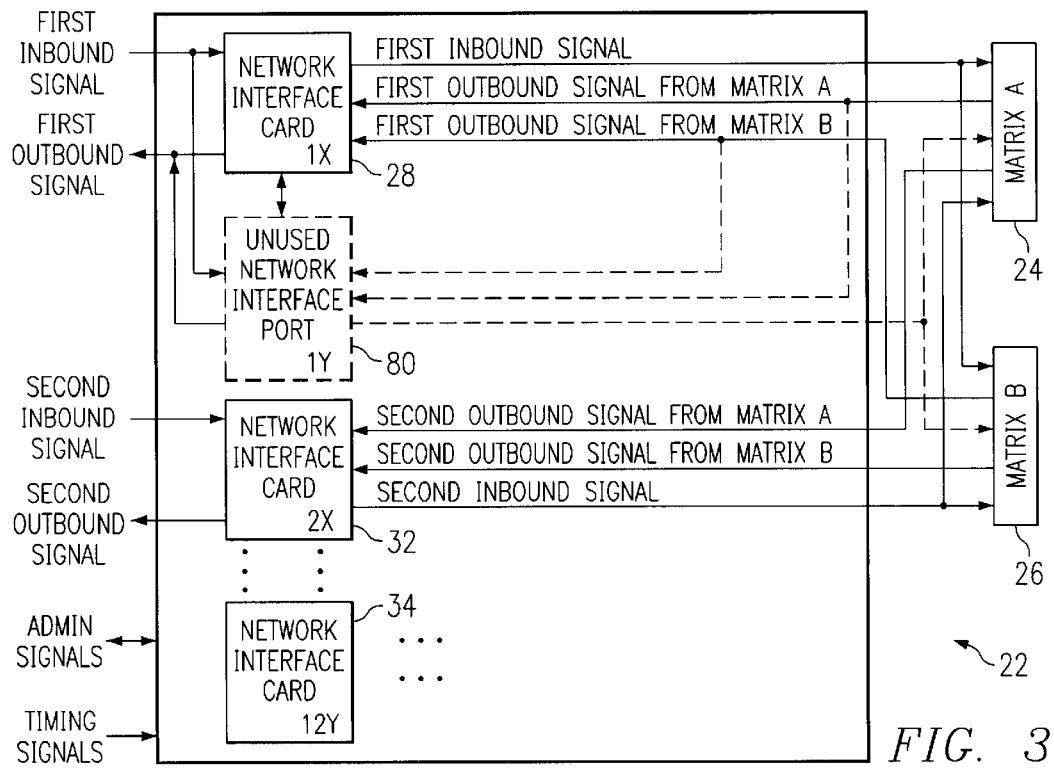
FIG. 3 is an overview block diagram illustrating the high density unit shelf having network interface cards provided in a non-redundant configuration.

A network interface card 34, provided in a second network interface port 12Y of the last network interface port pair, is also illustrated in FIG. 3 and couples between a network and digital cross-connect system 10. The operation of network interface card 34 is the same or similar to that just described above for network interface card 28. The companion first network interface port (not shown in FIG. 2) to network interface port 12Y may or may not be provided with a network interface card. This illustrates the fact the high density unit shelf 22 may be configured in both the redundant and non-redundant configuration.

FIG. 3 is an overview block diagram illustrating high density unit shelf 22 having network interface cards provided in a non-redundant configuration. The non-redundant configuration may be illustrated by examining a network interface port pair that includes only a single network interface card. For example, network interface card 28 is provided in the first network interface port 1X while the second network interface port 1Y, designated with the reference numeral 80, is unused. In this manner, redundant network interface processing does not occur and network interface card 28 provides all the processing for first inbound telecommunications signals and first outbound telecommunications signals.

In operation, network interface card 28 receives a first inbound telecommunications signal and converts the first inbound telecommunications signal from the first format to the second or proprietary format understandable by digital cross-connect system 10. The first inbound telecommunications signal is labeled as first inbound signal and is provided to both switching fabric 24 and switching fabric 26 so that both switching fabrics of matrix subsystem 16 are driven by network interface card 28.

In the outbound direction, network interface card 28 receives a first outbound telecommunications signal from switching fabric 24 and a first outbound telecommunications signal from switching fabric 26. Just as in the redundant configuration, network interface card 28 determines which of these signals provides the necessary integrity or quality to be processed and communicated to the attached network. Once chosen, network interface card 28 processes the first outbound telecommunications signal and converts it from the second or proprietary format to the first format compatible with the coupled network. The first outbound telecommunications signal is then communicated to the attached network.

Unused network interface port 80 provides additional reliability to high density unit shelf 22 even when configured in the non-redundant configuration. For example, unused network interface port 80 provides a path that allows information such as the ADMIN or TIMING signal information be provided from unused second network interface port 80 to the network interface port used by network interface card 28. This enhances overall reliability and availability by providing a redundant or second path for this information to be provided to network interface card 28. Furthermore, the non-redundant configuration reduces incremental costs as only one network interface card need be purchased.

Network interface card 32, provided in a first network interface port 2X of the second network interface port pair, is also illustrated in FIG. 3 and couples between a network and digital cross-connect system 10. The operation of network interface card 32 is the same or similar to that just described above for network interface card 28. Similarly, network interface card 34, provided in a second network interface port 12Y of the last network interface port pair, is also illustrated in FIG. 3 and couples between a network and digital cross-connect system 10. The operation of network interface card 34 is the same or similar to that just described above for network interface card 28. The companion first network interface port (not shown in FIG. 3) to network interface port 12Y may or may not be provided with a network interface card. This, once again, illustrates the fact the high density unit shelf 22 may be configured in both the redundant and non-redundant configuration.

High density unit shelf 22 provides an additional advantage when operating in the non-redundant configuration. In addition to providing a less expensive alternative as compared to the redundant configuration, high density unit shelf 22 provides an unused network interface port for each non-redundant configuration pair. This allows a single spare network interface card to be provided, as needed, for use in any of the unused network interface ports in the event that maintenance is needed on the primary network interface card. For example, high density unit shelf 22 may provide twelve network interface port pairs which allows for twelve non-redundantly configured telecommunications services to be provided. In such a case, a single spare network interface card could be provided which could be used in any of the twelve unused network interface ports so that maintenance could be performed on any one of the existing or primary network interface cards, such as network interface card 28. In this manner, interruption of service is greatly minimized and reduced while allowing for maintenance to be performed.

Figure 4:
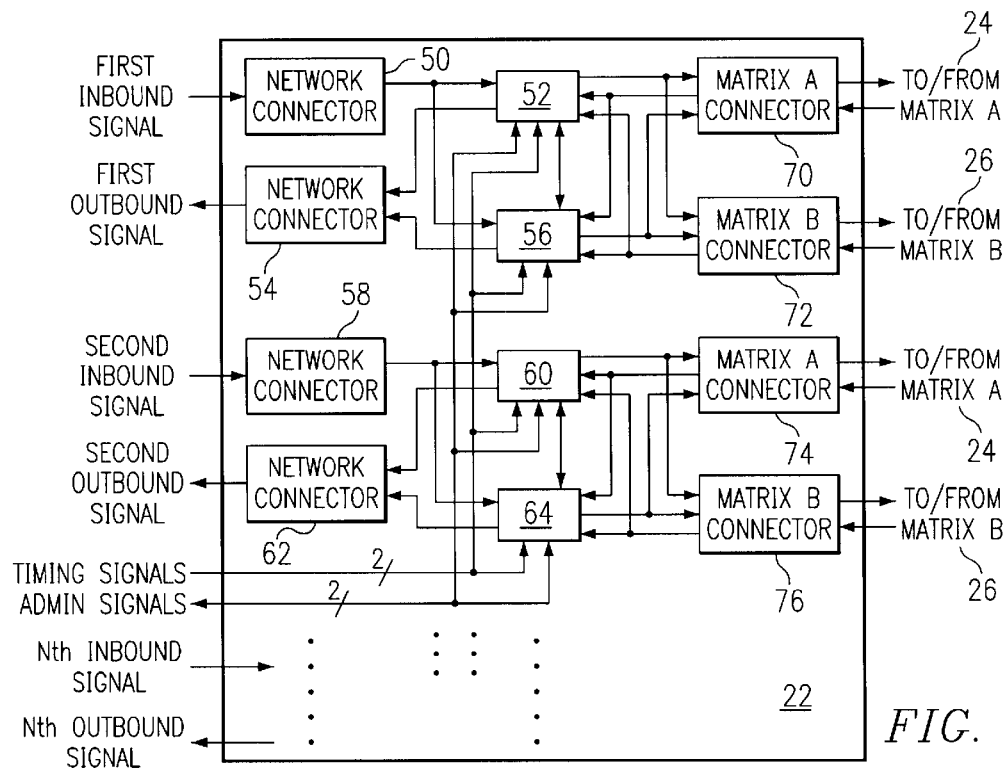
FIG. 4 is a block diagram illustrating the high density unit shelf without network interface cards.

FIG. 4 is a block diagram illustrating high density unit shelf 22 in more detail without the presence of any network interface cards in the network interface ports. High density unit shelf 22 includes a plurality of network interface port pairs. Each network interface port is operable to receive a network interface card and couple between an associated network and a digital switch such as digital cross-connect system 10. Two such network interface port pairs are illustrated in FIG. 4. A first network interface port 52 and a second network interface port 56 comprise a first network interface port pair, while a first network interface port 60 and a second network interface port 64 comprise a second network interface port pair. As was illustrated above, each of these network interface port pairs may contain either one or two network interface cards and operate in either a non-redundant configuration or a redundant configuration, respectively. Also, each network interface port may communicate with the other network interface port of the network interface port pair as illustrated by the double arrow between first network interface port 52 and second network interface port 56 and between first network interface port 60 and second network interface port 64.

In the embodiment of high density unit shelf 22 illustrated in FIG. 4, a network connector pair and a matrix connector pair are coupled to each network interface port pair. The first network interface port pair couples with a receive network connector 50 for receiving a first inbound telecommunications signal from a first network, and a transmit network connector 54 for communicating a first outbound telecommunications signal to the first network. The second network interface port pair couples with a receive network connector 58 for receiving a second inbound telecommunications signal from a second network, and a transmit network connector 62 for communicating a second outbound telecommunications signal to the second network, The receive network connectors and the transmit network connectors may be implemented using any of a variety of connectors such as, for example, a sixty-four pin connector, a CHAMP connector, and a bayonet-locking connector (BNC). The receive network connectors and transmit network connectors may also be implemented using dual or multiple connectors per connection such that, for example, receive network connector 50 may include both a CHAMP connector and a BNC connector. This increases the overall versatility of high density unit shelf 22 by providing the capability to handle either a low-speed or a high-speed telecommunications signal at a network interface port pair. In still other embodiments, the receive network connector and the transmit network connector for a network interface port pair may be implemented together as one network connector.

The first network interface port pair also couples with a matrix connector 70 for exchanging both an inbound and an outbound first telecommunications signal between the first network interface port pair and switching fabric 24. The first network interface port pair further couples with a matrix connector 72 for exchanging both an inbound and an outbound first telecommunications signal between the first interface port pair and switching fabric 26. Similarly, the second network interface port pair couples with a matrix connector 74 for exchanging both an inbound and an outbound second telecommunications signal between the second network interface port pair and switching fabric 24. Also, the second network interface port pair couples with a matrix connector 76 for exchanging both an inbound and an outbound second telecommunications signal between the second interface port pair and switching fabric 26. In one embodiment, matrix connector 70, 72, 74, and 76 may couple to the associated network interface ports described above using a parallel bus such as a sixteen-bit parallel bus. Generally, the various matrix connectors of high density unit shelf 22 exchange telecommunications signals with the switch fabrics of matrix subsystem 16 in a second format such as a proprietary format.

As mentioned above, it should be understood that each network interface port of each network interface port pair includes conductive paths or communication paths that allow information to be exchanged between each network interface port of each network interface port pair. For example, the redundant timing signals of high density unit shelf 22 are provided to each network interface port of each network interface port pair. As was mentioned above, timing subsystem 14 provides the redundant timing signals and will generally include redundant timing modules such that two timing signals will be provided to each network interface port. These timing signals may be provided through two separate timing buses that are provided to each network interface port. A first timing signal may be provided through a first timing bus while a second timing signal may be provided through a second timing bus. This is represented by the numeral 2 as is illustrated in FIG. 4. In this manner, high density unit shelf 22 provides enhanced reliability.

The ADMIN SIGNALS or redundant control signals are also provided to each of the network interface ports of high density unit shelf 22. Just as with the timing signals, the ADMIN SIGNALS may be provided using two separate buses to provide further redundancies within high density unit shelf 22. For example, the redundant control signals may be provided through two separate serial control links that couple to each network interface port. The redundant control signals may be provided such that a first serial control link bus may provide a first control signal while a second serial control link bus may provide a second control signal. In this manner, additional redundancies are provided such that if any network interface port fails to receive either the first control signal or the second control signal directly, a communication path is available from the other network interface port of the network interface port pair to provide the redundant control signals. This further increases the reliability and availability of high density unit shelf 22. In other embodiments, the redundant control signals may be provided through two separate parallel control links that couple from administrative subsystem 12 to each network interface port.

The operation of high density unit shelf 22 may best be described by focusing on the first network interface port pair that includes first network interface port 52, second network interface port 56, receive network connector 50, transmit network connector 54, matrix connector 70, and matrix connector 72. A first inbound telecommunications signal is received from a network at receive network connector 50 and provided to both first network interface port 52 and second network interface port 56. The first inbound telecommunications signal will be received from the network in a first format such as the DS1, E1, DS3, and STS-1 formats. The first inbound telecommunications signal will then be converted to a second format by both a first network interface card provided in first network interface port 52 and a second network interface card provided in second network interface port 56. The second format may be any format understandable by an associated digital switch such as a proprietary format compatible with digital cross-connect system 10. Thus, two of the first inbound telecommunications signals are available to be provided to matrix connector 70 and matrix connector 72.

The first inbound telecommunications signals will then be communicated from first network interface port 52 and second network interface port 56 to matrix connector 70 and matrix connector 72. Depending on how the network interface cards are configured, the first inbound telecommunications signal from first network interface port 52 may be provided to matrix connector 70 or both matrix connector 70 and matrix connector 72. Similarly, and also depending on how the network interface cards are configured, the first inbound telecommunications signal from second network interface port 56 may be provided to matrix connector 72 or both matrix connector 72 and matrix connector 70. Matrix connector 70 then provides the signal it receives to a designated switching fabric such as switching fabric 24. Matrix connector 72 also provides the signal it receives to a designated switching fabric such as switching fabric 26.

High density unit shelf 22 receives a first outbound telecommunications signal at matrix connector 70 from a switching fabric such as switching fabric 24, and a first outbound telecommunications signal at matrix connector 72 from a switching fabric such as switching fabric 26. Thus, in one embodiment, redundant and distinct outbound telecommunications signals are received by high density unit shelf 22. Both of these outbound signals are provided in the second format discussed above. Depending on how the network interface cards are configured, matrix connector 70 may provide the first outbound telecommunications signal received from switching fabric 24 to only first network interface port 52 or both first network interface port 52 and second network interface port 56. Similarly, and also depending on how the network interface cards are configured, matrix connector 72 may provide the first outbound telecommunications signal received from switching fabric 26 to only first network interface port 56 or both first network interface port 56 and second network interface port 52.

At this point, each network interface card converts the outbound telecommunications signal it receives from the second format to the first format. Both of theses signals may then be communicated to transmit network connector 54 where the signal will be provided to the network. Although both network interface port 52 and network interface port 56 may provide a first outbound telecommunications signal to transmit network connector 54, only one will provide a signal. This choice may be decided in real-time or using firmware or software control. In other embodiments, receive network connector 50 and transmit network connector 54 may be implemented as a single network connector.

Figure 5:
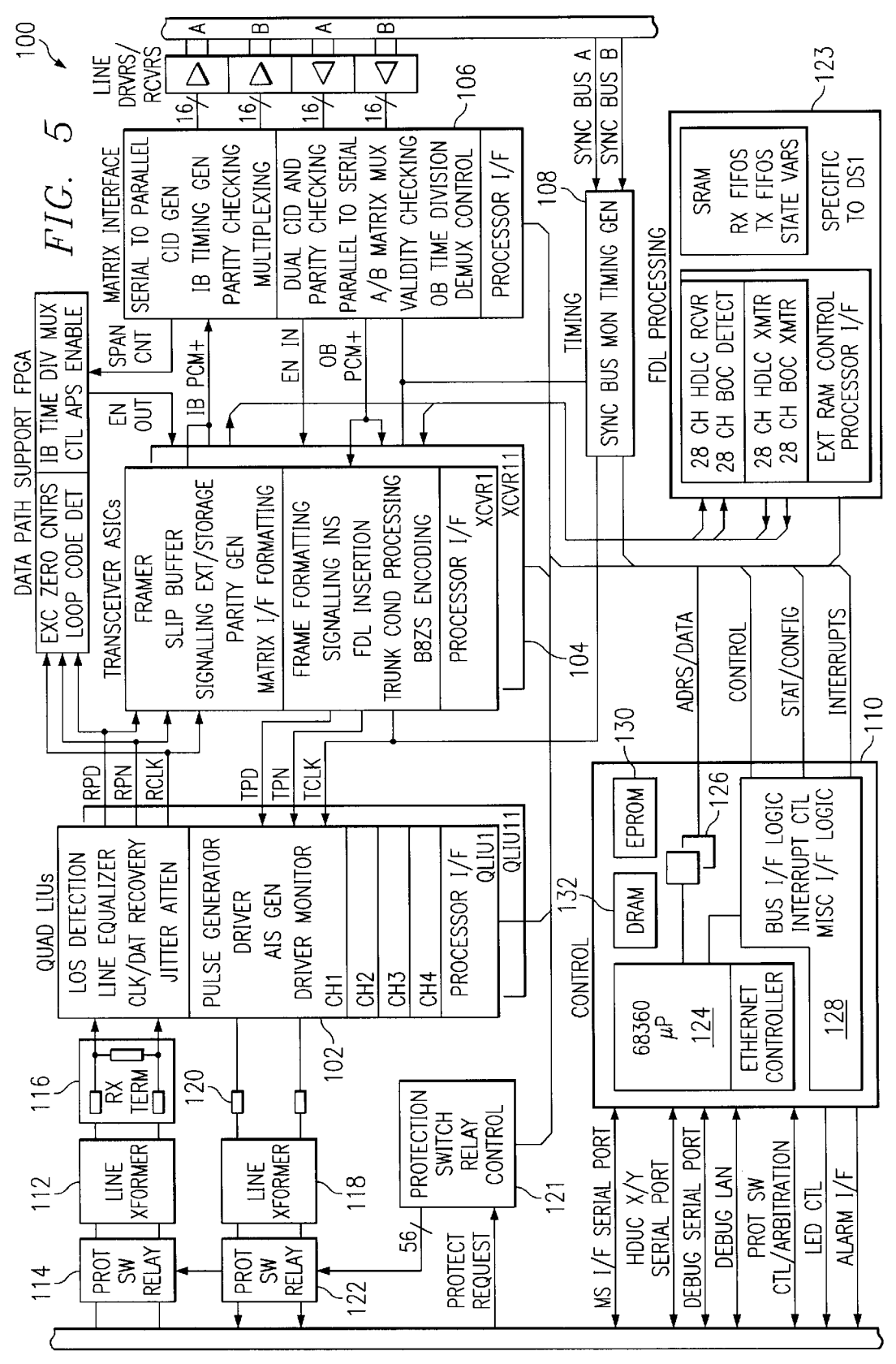

FIG. 5 is a block diagram illustrating high density unit shelf network interface card 100. Network interface card 100 is similar to network interface card 28, 30, 32, and 34 as discussed above and may be used in any of the available network interface ports of high density unit shelf 22. Network interface card 100 includes an outbound processing circuit 102 and an inbound processing circuit 104.

Network interface card 100 is implemented with a line interface 102, Transceiver Framer 104 and a Matrix Interface (MI) 106. Additional functions include a Timing Control/Generator 108 and a microprocessor based control section 110.

Network interface card 100, in an exemplary DSI configuration, contains 28 complete two-way DS1 signal interfaces. Each path demultiplexes the incoming DS1 into its 24 constituent DS0 signals, and multiplexes up to 14 outgoing DS0s into a DS1 signal. The performance of each DS1 is monitored. The features of network interface card 100 for this configuration are summarized below.

28 Transmit and Receive DS1 Ports

1:1 DS1 Channel Sparing Ports

DS1 Path, Line, and Far End Performance Monitoring

Short Haul LIU with Receiver Jitter Alternator and Line Build Outs

SF, ESF, SLC-96 Transparent and Intact Framing Modes

Facility Data Link Support for Message and Bit Oriented Protocols

Loopback Test Modes

DC-L8 Circuit Pack Compatibility

Timing Bus Monitor/Selector

Microprocessor Control w/Downloadable Firmware

Backplane Serial Debug Port

Firmware Debug LAN IF Daughterboard

Administrative I/F via MS Serial Control BUS

Alarm Interface

On Board DC/DC Conversion (−48VDC to +5VDC)

Inventory Control—CLEI Code Storage

Design for Test

Migration to High Speed Adminigtration

In-Circuit Programming

Network interface card 100, in an exemplary E1 configuration, contains 21 complete two-way E1 signal interfaces and also provides G.747 capability which consists of multiplex/demultiplex of 21 E1 signals into a DS3. Each path demultiplexes the incoming E1 into its 32 constituent DS0 signals, and multiplexes up to 32 outgoing DS0s into a E1 signal. The performance of each E1 is, monitored. The features of network interface unit 100 for this configuration are summarized as follows:

21 Transmit and Receive E1 Ports
1: E1 Channel Sparing Ports
E1 Path, Line and Far End Performance Monitoring
Short Haul LIU with Receive Jitter Attenuator
FAS, CRC4, Transparent and Intact Framing Modes
CAS, CCS Signaling Modes
Sa Bit Processing ("Facility Data Link")
Loopback Test Modes
Timing Bus Monitor/Selector
Microprocessor Control w/Downloadable Firmware
Backplane Serial Debug Port
Firmware Debug LAN I/F Daughtercard
Administrative Interface via MS Serial Control Bus The clock and framing signals generated by the administrative subsystem are routed to network interface card 100 on a SYNC-unit bus. This bus is redundant and carries A and B sets of the following differential clock and framing signals: 16.128 MHZ, 1.544 MHZ, 8 kHz frame synchronization, and 333.33 Hz super frame synchronization.

Figure 6:
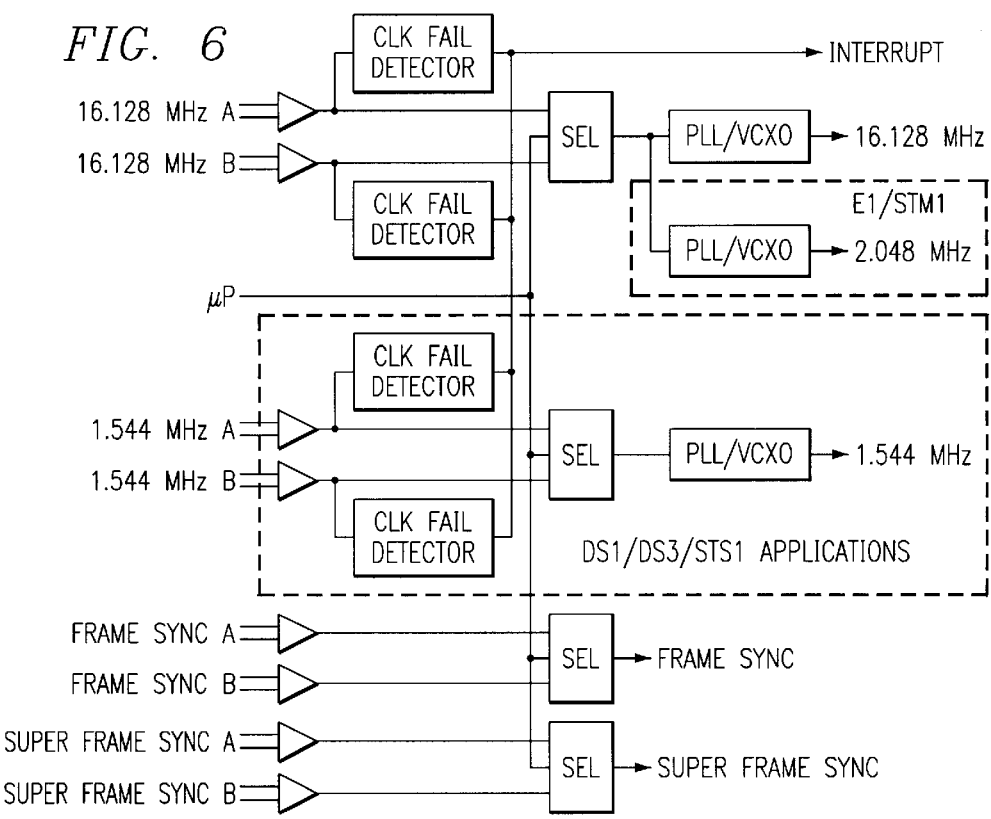
FIG. 6 is a block diagram illustrating timing signals for a timing generator of the network interface card.

Each network interface card 100 will detect the loss of 16.128 MHZ clock for both A and B and for DS1 applications, detect the loss of both A and B 1.544 MHZ clocks. Each network interface card 100 includes timing control/generator 108 as shown in FIG. 6. The 16.128 MHZ and 1.544 MHZ redundant, differential clocks come from the backplane and are tested for presence. The detector will test for presence of transitions and it is desirable that frequency accuracy be tested. If the A clock fails, then an interrupt will be sent to the microprocessor. The microprocessor can select the A or B clock bus. PLL and VCXO will filter phase transients caused by timing bus switches and provide a keep alive clock when both A and B clocks have failed. This keep alive clock will be used for the generation of AIS in the inbound and outbound directions. Note, the differential receivers are unterminated as the termination is mounted on the backplane, however a high impedance fail safe may be included.

Timing reference outputs from each network interface card 100 are provided This reference will be derived form the first and second incoming network signals and will be the received network line rate (i.e., 1.544 MTTE for DS1 and 2.048 MTTE for E1). The reference output will be a differential clock signal. Control section 110 will have the ability to force the reference clock output to a solid '1' state to signal that a network error has occurred. Network errors are defined as LOS, LOF, or do not use for sync message received on the facility datalink. Each timing reference output will have a tristate enable which will be controlled by the control section 110 allowing multiple timing references to be connected together.

The backplane will connect the reference outputs from redundant X and Y network interface card 100 together. Under software control, the X or Y reference output will be enabled. For example, the reference derived from received clock of network interface card 100 1, port 1, rack 1 is connected to the reference A input. Port 2 of network interface card 100, rack 2 is connected to the reference B input. By providing two reference outputs from each shelf and two separate network interface card 100, small one shelf systems can supply the A and B reference inputs from diverse sources. In addition, large systems can increase source diversity by selecting the references from different racks.

Figure 7:
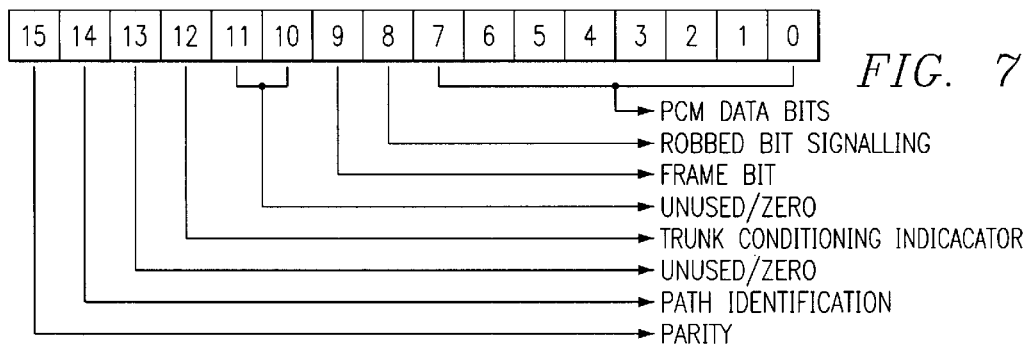
FIG. 7 is a block diagram illustrating a data format within the network interface card for a first type of network telecommunications signal.

Matrix interface 106 has a proprietary data format which implements a differential, 9.176 MHZ, 16 bit parallel cable connection. The proprietary data format is shown in FIG. 7. To reduce the power at the network interface card 100, unused bits 10, 11, and 13 may not be connected. These unused bits will be a logic 0 for purposes of parity calculation. Each network interface card 100 will have connectivity to redundant A and B differential inbound and outbound matrix planes. The matrix planes convert the 16 bit proprietary data format to a 10 bit format also at 5.376 MHZ. The matrix planes maintain compatibility with the proprietary data format by deleting the unused bits and time division multiplexing the definition of bit 9. Each format has a 672 DS0 capacity and the overhead allows for transport of path ID, parity, trunk conditioning, and frame bit location.

For DS1 data transport, the proprietary data format provides transport of 16 bits at a 5.736 MHZ rate for a total transport bandwidth of 672 DS0's plus overhead, or 28 DS1's. The proprietary data format interleaves one DS0 from 1 of 28 DS1's. As a result of this byte interleaving, each word appearing on the data bus to and from the matrix planes is ordered such that DS0 number 1 from DS1 number 1 is first, then DS0 number 1 from DS1 number 2 and so on until DS0 number 24 from DS1 number 28. This 672 channel structure repeats every 125 uS and is defined by a system generated 125 us frame sync. The DS1 network data is frame aligned to the 125 uS frame sync signal with Transceiver Framer 104 elastic store. Slips will be performed on frame boundaries. Transceiver framer 104 has a two frame buffer to align data to the frame sync signal, but data is not aligned to the superframe sync. As a result, signalling data is not aligned to the superframe sync. However, signalling is preferably aligned to the superframe sync while data is not. To align the signalling data to the superframe sync, two superframes of signalling data are buffered.

The definition of the 13 bits used in the proprietary data format are as follows:

PCM—DS0 data received from the network; LSB is the first bit received from the network.

SIG—Robbed bit signalling data valid only for signalling frames, '0' otherwise.

F—Frame bit received from the network; valid only for the first DS0 channel of the inbound data. Must be valid in the first DS0 channel of the outbound data. When unframed intact mode is selected, bit will be an arbitrary network data bit.

TC—Trunk conditioning bit. In the inbound direction this bit is set by microprocessor control while in the outbound direction will trigger trunk conditioning. This bit is valid in all time slots.

ID—Path ID. Each DS0 channel has a unique 24 bit path identification code

P—Parity Even or odd? calc over 12 or 13 bits?

Figure 8:
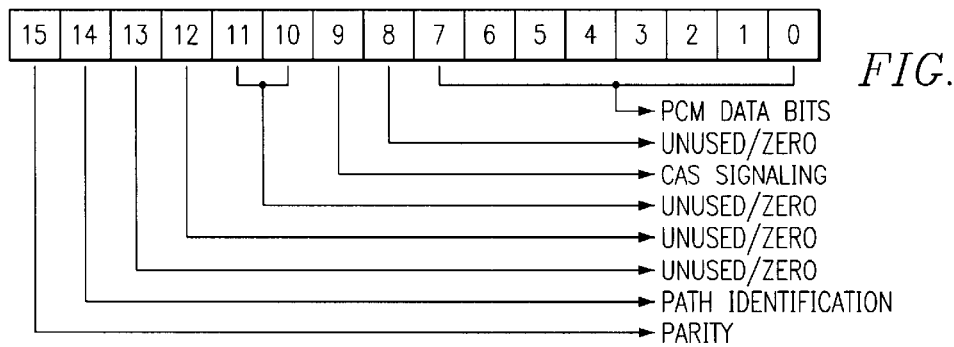
FIG. 8 is a block diagram illustrating a data format within the network interface card for a second type of network telecommunications signal.

For E1 data, transport through the matrix will differ slightly from DS1 transport due to the fact E1 has 32 time slots rather than 24. The signaling associated with a DS1 proprietary data format occupies bit 8 of the 16—bit matrix data word, and is valid during frames 6, 12, 18 and 24 of the 24 frame superframe. To accommodate the 1 ms superframe and signaling format, the proprietary data format for E1 is modified as shown in FIG. 8. The signaling data in an E1 proprietary data format occupies timeslot 16 of the 32 timeslot frame. Timeslot 16 is defined such that each DS0 has four bits of signalling information and two channels of signalling information included in each timeslot 16. E1 has a 2 mS superframe which defines which two channels of signalling information is carried in timeslot 16. Because of the difference in superframe rates between E1 and DS1 (2 ms versus 3 ms in DS1), E1 signalling data is carried in what is normally the proprietary data format frame bit location.

High density unit shelf 22 uses matrix transport delays which must be accounted for in the network interface card 100 circuit designs. Transceiver framer 104 is referenced at network interface card 100 as sourcing bit 1, timeslot 1, frame 1 at the superframe and frame sync pulse. The delays between the Transceiver Framer 104 and high density unit shelf cause the bit, timeslot, and frame locations to be skewed when the data reaches the matrix planes. This skew is compensated by adjusting the matrix maps. As a result of this compensation, all network interface cards 100's source the inbound data using the existing offsets. In the outbound direction, network interface card 100 takes into the account the delay through the matrix planes to determine where each span and timeslot is located.

The alarm interface provides a mechanism to visually indicate alarms via the rack fuse panel LED's. In addition, detection of fuse failures and fuse panel power failures is provided by this interface. Each network interface card 100 is equipped with a normally closed double pole mechanical relay which has the closed position attached to ground. The normally open pole is open while the throw is attached to ALARM_OUT signal. The backplane ties all network interface card 100 ALARM_OUTs together and then provides connectivity to the fuse panel via the Alarm Interface nine pin D connector. When the fuse panel shelf alarm input is shorted to the ground, the shelf alarm LED is illuminated. Fuse panel power failures are detected by all network interface card 100's. Each network interface card 100 has a PWR_ALM_A_IN and PWR_ALM_B_IN input. If the fuse panel detects a fuse failure or power is lost, it will pull the either PWR_ALM_A_IN or PWR_ALM_B_IN to a logic low. Finally each network interface card 100 ha a FP-5V_MON input to monitor the status of the fuse panel on-board 5 Volt power supply. This input will be low if the supply fails.

In the inbound direction for the exemplary DS1 configuration, tip and ring DS1 signals are received at LIU 102. The line interface hardware includes the required 1:1.14 turns ratio, center tapped transformer 112, line protection hardware 114 and receive line termination 116. A solid state relay 102 is used in the relay path to,open the receive circuit in the event of power failure (blown fuse) and for isolation during card insertion. LIU 102 performs line equalization, clock/data recovery and jitter attenuation. Analog and digital Loss of Signal monitoring is performed on the received signal. The LIU in line protection hardware 114 outputs dual-rail NRZ data and the recovered clock to the Transceiver/Framer 104.

Transceiver/Framer 104 performs optional B8ZS decoding, monitors for Bipolar Violations (BPV) and maintains an 8-bit BPV error count. Carrier Loss, Yellow (RAI), and Blue (AIS) alarms are detected by Transceiver/Framer 104. A programmable logic device is used to detect and count Excessive Zero errors. Framing to the provisioned framing format is performed. The framer operates off-line of the data stream so all bits received may be passed through to the system. Frame synchronization status and framing bit errors are reported. A two frame elastic store is used to absorb the differences in frequency (data rate) and phase (frame boundaries) between the incoming DS1 signal and the DEXCS system timing. System data rate and frame timing signals are provided to the Transceiver by the timing control block. Robbed bit signaling extraction is performed per the provisioned frame format. A two superframe buffer is provided for the alignment of input T1 span signalling to system timing. The extracted signalling data is available via microprocessor register access. Facility Data Link extraction is supported in both ESF (via the DL bit position) and SF (via Fs bit positions) framing modes The extracted data is output form the Transceiver to the FDL processor via a serial data port. Transceiver/Framer 104 converts the serial T1 data stream into a 12-bit parallel matrix interface format. Each 12-bit word contains 8 PCM data bits for the DS0 channel, a signaling bit, a framing bit, a Trunk Conditioning Indicator bit, and a parity bit. The tristate control of the parallel data output of the Transceivers is used to time division multiplex the 28 192 Khz streams into the 5.376 MHz matrix interface rate. The inbound parallel outputs of all 28 Transceivers are tied together and logic is used to sequentially enable each tristate output. Inbound Matrix Interface 106 implements channel ID generation, the time division multiplexing control and parity checking logic. From system clocks and frame strobes, MI 106 generates the required 5-bit count from which the 28 output enables may be decoded. In order to implement the TR 54017 APS functionality, additional logic is provided to enable the duplication of selected T1 spans in the matrix data. The resulting inbound matrix interface 106 bus is driven differentially onto the backplane. In the 1:1 protected mode, network interface card 100 will feed inbound data to a single matrix plane. In the unprotected mode, network interface card 100 supplies inbound data to both matrix planes.

In the outbound direction, the Matrix Interface 106 accepts data from both matrix planes. Both planes are monitored for valid parity and path ID and one plane is selected for conversion into network signals. Plane selection is controlled by system administration, but automatic switching capability is supported by the network interface card 100 firmware in case the selected plane fails. The selected matrix plane is routed to all.

The outbound Matrix Interface 106 provides the input enable signals to the Transceiver/Framer 106 to control the demultiplexing of the 5.376 MHz stream. Transceiver/Framer 104 clocks in matrix interface data at the 192 Khz rate. Transceiver/Framer 104 also contains a parity monitor that may be configured to detect and count parity errors globally or on a single DS0 channel. The parallel data is serialized and formatted for the provisioned framing format. Transceiver/Framer 104 controls signalling insertion, FDL insertion, CRC generation and framing pattern insertion. Each of these features is provisionable to support various modes and formats. The Trunk Conditioning Indicator (TCI) bit accepted from the matrix may be used to control the insertion of idle codes in place of the PCM data and/or the insertion of a signalling pattern.

Transceiver/Framer 104 performs selectable B8ZS encoding and outputs dual-rail NRZ data to LIU 102. System 1.544 MHz timing is supplied to Transceiver/Framer 104 and LIU 102. LIU 102 implements the pulse generator, line driver, and line build out for the T1 line. A 1.14:1 transformer 118 and series source terminations 120 complete the line interface. A solid state relay 122 implements the protection switch control. In the 1:1 protection mode, a single DS1 line may be driven by either of the two cards in the pair. Logic is provided on board to resolve which card will drive the line.

The Facility Data Link processing supports both the message oriented HDLC/LAPD and Bit Oriented Code (BOC) formats. The HDLC receiver performs flag, abort, start/end or frame detection, zero bit destuffing CRC calculation and checking. The extracted message bytes are stored in a large FIFO. The BOC receiver-operates in parallel with the HDLC controller. A code must be received n out of m times to be validated (see T1.403). Validated codes are placed in a register and interrupt may be generated upon reception. HDLC messages to be transmitted are placed in the transmit FIFO. Frame formatting, CRC generation/insertion and zero bit stuffing are performed automatically. Only the body of the message is placed in the FIFO. BOC messages are sent by placing the desired code in a register and setting the enable control bit. The BOC message is then sent repeatedly (per T1.403). BOC transmissions preempt any HDLC transmissions in progress.

Control section 110 of the network interface card 100 consists of the MC68360 Quad Integrated Communications Controller (QUIC) 124, memory 126 and support logic 128. Two megabytes of Flash EPROM 130 and 8 megabytes of DRAM 132 are used for code and data storage. QUIC 124 integrates with six serial controllers, three parallel I/O ports and a glueless memory interface. The serial ports of the 68360 are used to implement the dual MS SCL, ethernet, debug and companion card communications ports. Many parallel I/O port pins of QUIC 124 are shared with other internal functions. In this application, at least 16 pins of three parallel ports will be available for general purpose I/Os. All pins on Port C have interrupt capability. These pins in addition to the six dedicated interrupt pins (16 total) will be used to provide direct, vectored interrupts to Transceiver/Framer 104 and to each LIU 102. External logic is provided to implement the required parallel I/O ports and interrupt inputs not supplied by QUIC 124.

Timing control/generator 108 implements a redundant timing bus interface and all timing signal generation for the LIU 102 and matrix interface 106 logic. The network interface card 100 accepts two, four signal timing busses from the Timing/Control Generator 108. Monitor and selection circuitry provides failure detection and timing plane switching capability. The selected timing bus will be used for local timing signal generation.

In the inbound direction for the exemplary E1 configuration, tip and ring E1 signals are received via high density connectors on the backplane. The line interface hardware includes the required 1:1.36 turns ratio, center tapped transformer 112 and receive line termination 116. The solid state relay 114 is used in the relay path to open the receive circuit in the event of power failure (blown fuse) and for isolation during card insertion. LIU 102 performs line equalization, clock/data recovery and jitter attenuation. Analog and digital Loss Of Signal monitoring is performed on the received signal. LIU 102 outputs dual-rail NRZ data and the recovered clock to the transceiver/framer 104.

Transceiver/framer 104 performs options HDB3 decoding and line and path performance monitoring. Framing to the provisioned framing format is performed. Transceiver/framer 104 operates off-line of the data stream so all bits received may be passed through to the system. Frame synchronization status and framing bit errors are reported. Transceiver/Framer 104 provides trunk conditioning which forces programmable trouble code substitution and signalling conditioning on all time slots or on selected time slots. A two frame elastic store is used to absorb the differences in frequency and phase (frame boundaries) between the incoming E1 signal and system timing. System frame timing (8 Khz) and a gapped 2.688 MHz clock are applied to the system side of the elastic store. Transceiver/Framer 104 outputs 21 serial PCM streams aligned to the system bit and frame timing. When applicable, Transceiver/Framer 104 can indicate the position of CRC-4 Multiframe boundaries. However, the 21 inbound PCM streams are not multiframe aligned. The gapped clock applied to the system side of the elastic store toggles 8 times within the 3.906 uS period so that the average clock rate is still 2.048 MHz. The use of a gapped clock on the system side of the receiver elastic store greatly simplifies the matrix interface 106 logic. The signalling extractor block within Transceiver/Framer 104 extracts, stores, optionally debounces, and timeslot aligns CAS signalling bits. Transceiver/Framer 104 provides optional signalling data inversion and programmable idle code substitution. The signalling data is timeslot aligned but the CAS multiframes of the 21 individual E1s are unrelated to system timing. The signalling data is output serial, synchronized to the PCM time slots. The signalling data is valid during PCM data bit times 5–8. Transceiver/Framer 104's internal signalling buffers are updated (by definition of the CAS multiframe format) once every 16 frames. Therefore, serially output signalling data is repeated 16 times during the CAS multiframe.

The inbound Matrix Interface 106 logic accepts the 21 system timed, serial PCM streams. The streams are converted to a parallel format and multiplexed to produce the 5.376 MHz byte wide data stream. TCI, Path ID, signalling and Parity bits are added to complete the 16-bit parallel matrix interface 106 format. The TCI bits (1 bit for each of the 21 E1 spans) are configured under microprocessor control. The matrix interface unit 106 is used to generate the CID bits. Signalling bits are serial-to-parallel converted in a manner similar to the PCM data. Signalling bits are only transported through the matrix once during every 2 mS signalling multiframe. The four signalling data bits (A, B, C, D) for each DS0 are transported in the F-bit positions of the matrix interface 106 bus during four successive frames. The resulting inbound matrix interface 106 bus is driven differentially onto the backplane. In the 1.1 protected mode, network interface card 100 will feed inbound data to a single matrix plane. In the unprotected mode, network interface card 100 supplies inbound data to both matrix planes.

In the outbound direction Matrix Interface 106 accepts data from both matrix planes. Both planes are monitored for valid parity and path ID and one plane is selected for conversion into network signals. Plane selection is controlled by system administration, but automatic switching capability is supported by the firmware in case the selected plane fails. The PCM data from the selected plane is written into a dual-port RAM at the 5.376 MHz rate. An indirect addressing scheme is used to demap the data from the matrix interface 106 timeslot order. On the network side of the interface logic, the PCM data is read out of the DPRAM in a linear, byte interleaved format in 21 byte blocks. Twenty one parallel to serial converters produce the serial PCM data streams fed to the Transceiver/Framer 104. The signalling data is accumulated from the F-bit positions during the signalling frames and stored. On the network side of the Outbound Matrix Interface Logic, the 21 4-bit signalling nibbles are fed to Transceiver/Framer 104 serially. The signalling bits are timeslot aligned and valid during bits 5–8.

The signalling data is repeatedly shifted into the Transceiver/Framer 104 during all 16 frames in the CAS multiframe. CAS multiframe timing is provided to the Transceiver/Framer 104 by the Outbound Matrix Interface 106 logic.

Transceiver/Framer 104 formats the serial data streams and optionally inserts signalling multiframe alignment and/or CRC multiframe alignment structures. All framing, CRC, Sa bit and timeslot 16 data insertion may be disabled for intact and transparent modes. Channel associated signalling data may be optionally sourced form the serial signalling inputs or registers. Programmable idle code substitution, digital milliwatt code substitution and data inversion may be enabled on a timeslot basis. Transceiver/Framer 104 performs selectable HDB3 encoding and outputs dual-rail NRZ data to LIU. System 2.048 MHz timing is supplied-to Transceiver/Framer 104 and LIU 102. LIU 102 implements the pulse generator, line driver, line build of for the T1 line. A 1.36:1 transformer 118 and series source terminations 120 complete the line interface. A solid state relay 122 implements the protection switch control. In the 1:1 protection mode, a single DS1 line may be driven by either of the two cards in the pair. Logic is provided on board to resolve which card will drive the line. The Facility Data Link processing is supported by the framing. An HDLC/LAPD is provided which supports polled, interrupt driven of DMA servicing. Transceiver/Framer 104 can be configured to use timeslot 16 or timeslot 0 National Use bits for the data link. The internal FDL processor performs all data serialization, CRC generation/checking, zero bit stuffing/de-stuffing as well as fag, idle and abort sequence insertion and detection.

System data rate and frame timing signals are provided to both the framer and the Matrix Interface 106 Mapping logic by Timing Control/Generator 108. The Timing Control/Generator 108 receives redundant timing busses form the Timing Admin Subsystem. Each bus consists of four differential signals; 16.128 MHz and 1.544 MHz clocks, and 8 Khz and 333.33 Hz frame strobes. Both busses are monitored and timing plane selection is performed under processor control. For the E1 application the 2.048 MHz data rate is synthesized from the 16.128 MHz system clock with a 32.768 MHz Phase Locked Loop.

Thus, it is apparent that there has been provided, in accordance with the present invention, a high density unit shelf network interface card and method of operation that satisfies the advantages set forth above. Although the present invention has been described in detail, it should be understood that various changes, substitutions, and alterations can be made herein. For example, the present invention may be operated in redundant mode, non-redundant mode, or a combination of both redundant mode and non-redundant mode. Furthermore, the direct connections illustrated herein could be altered by one skilled in the art such that two devices are merely coupled to one another through an intermediate device or devices without being directly connected while still achieving the desired results demonstrated by the present invention. For example, first network interface port 52 may couple with receive network connector 50 and matrix connector 70 through an intermediate device or element without departing from the present invention. Furthermore, although the present invention has been illustrated and described as being used with a digital cross-connect system, such as a DSC digital cross-connect system, it should be understood that the present invention is not limited to being used with any one particular digital cross-connect system and may in face be practiced with virtually any digital switch. Other examples of changes, substitutions, and alterations are readily ascertainable by one skilled in the art and could be made without departing from the spirit and scope of the present invention as defined by the following claims.

What is claimed is:

1. A network interface card for use in either a first network interface port or a second network interface port of a network interface port pair of a high density unit shelf, the network interface card comprising:

an inbound processing circuit operable to process an inbound telecommunications signal in any of a variety of different first network digital communications signal formats received over a network link and to generate an inbound telecommunications signal in a second digital communications signal format for switching of the inbound telecommunications signal independent of the first network digital communications signal format; and an outbound processing circuit operable to receive first and second outbound telecommunications signals in the second digital communications signal format and to generate an outbound telecommunications signal in any of the variety of first network digital communications signal formats from a selected one of the first and second outbound telecommunications signals in the second digital communications signal format.

2. The network interface card of claim 1, wherein the inbound processing circuit includes:

a line interface unit operable to receive the inbound telecommunications signal in the first network digital communications signal format; and a transceiver framer unit operable to convert the inbound telecommunications signal from the first network digital communications signal format to the second digital communications signal format.

3. The network interface card of claim 1, wherein the inbound processing circuit includes:

a matrix interface unit operable to transport the inbound telecommunications signal in the second digital communications signal format to a switching matrix.

4. The network interface card of claim 1, wherein the network interface card is operable to couple with a first network interface port of a network interface port pair of the high density unit shelf and to receive timing signals through a second network interface port of the network interface port pair.

5. The network interface card of claim 1, wherein the network interface card is operable to connect to a first network interface port of a network interface port pair of the high density unit shelf and operable to receive control signals from an administrative subsystem of the high density unit shelf through a second network interface port of the network interface port pair.

6. The network interface card of claim 1, wherein the first network digital communications signal format is a DS1 format.

7. The network interface card of claim 1, wherein the first network digital communications signal format is a DS3 format.

8. The network interface card of claim 1, wherein the first network digital communications signal format is a E1 format.

9. The network interface card of claim 1, wherein the first network digital communications signal format is a STS-1 format.

10. The network interface card of claim 1, wherein the second digital communications signal format is a proprietary digital cross-connect switch format.

11. The network interface card of claim 1, wherein the second digital communications signal format is a DS0 format.

12. The network interface card of claim 1, wherein the inbound telecommunications signal is provided at a T-1 signal rate.

13. The network interface card of claim 1, wherein the T-1 signal rate is 1.554 Mbps.

14. The network interface card of claim 1, wherein the outbound processing circuit is operable to communicate the outbound telecommunications signal in the first network digital communications signal format to a network.

15. The network interface card of claim 1, wherein the network interface card is implemented in a circuit card.

16. A network interface card for use in either a first network interface port or a second network interface port of a network interface port pair of a high density unit shelf, the network interface card comprising:

an inbound processing circuit operable to process an inbound telecommunications signal in any of a variety of different first network digital communications signal formats received over a network link and to generate an inbound telecommunications signal in a second digital communications signal format common for switching the inbound telecommunications signal independent of the first digital communications signal format; and an outbound processing circuit operable to receive first and second outbound telecommunications signals in the second digital communications signal format and to generate an outbound telecommunications signal in any of the variety of different first digital communications signal formats from a selected one of the first and second outbound telecommunications signals in the second digital communications signal format, wherein the inbound processing circuit is operable to communicate the inbound telecommunications signal to both a first matrix and a second matrix of a digital cross-connect system.

17. A network interface card for use in either a first network interface port or a second network interface port of a network interface port pair of a high density unit shelf, the network interface card comprising:

an inbound processing circuit operable to process an inbound telecommunications signal in any of a variety of different first network digital communications signal formats received over a network link and to generate an inbound telecommunications signal in a second digital communications signal format; and an outbound processing circuit operable to receive first and second outbound telecommunications signals in the second digital communications signal format and to generate an outbound telecommunications signal in any one of the variety of different first network digital communications signal formats from a selected one of the first and second outbound telecommunications signals in the second digital communications signal format, wherein the outbound processing circuit is operable to provide the outbound signal as a tri-state signal.

18. A network interface card for use in either a first network interface port or a second network interface port of a network interface port pair of a high density unit shelf, the network interface card comprising:

an inbound processing circuit operable to process an inbound telecommunications signal in any of a variety of different first network digital communications signal formats received over a network link and to generate an inbound telecommunications signal in a second digital communications signal format; and an outbound processing circuit operable to receive first and second outbound telecommunications signals in the second digital communications signal format and to generate an outbound telecommunications signal in any one of the first network digital communications signal formats from a selected one of the first and second outbound telecommunications signals in the second digital communications signal format, wherein the network interface card interfaces with either the first network interface port or the second network interface port of the network interface port pair using an edge card connector.

19. A network interface card for use in either a first network interface port or a second network interface port of a network interface port pair of a high density unit shelf, the network interface card comprising:

an inbound processing circuit operable to process an inbound telecommunications signal in any of a variety of different first network digital communications signal formats and to generate an inbound telecommunications signal in a second digital communications signal format; and an outbound processing circuit operable to receive first and second outbound telecommunications signals in the second digital communications signal format and to generate an outbound telecommunications signal in any of the variety of first network digital communications signal formats from a selected one of the first and second outbound telecommunications signals in the second digital communications signal format, wherein the outbound processing circuit is further operable to select the first or second outbound telecommunications signal in a second digital communications signal format from either a first matrix or a second matrix of the digital cross-connect system.

20. A network interface card for use in either a first network interface port or a second network interface port of a network interface port pair of a high density unit shelf, the network interface card comprising:

an inbound processing circuit including:
a line interface unit operable to receive an inbound telecommunication signal in a first format;
a transceiver framer operable to process the inbound telecommunications signal in the first format and to generate an inbound telecommunications signal in a second format;
a matrix interface unit operable to transport the inbound telecommunications signal in the second format to a switching matrix;

an outbound processing circuit including:
a matrix interface unit operable to receive a first outbound telecommunications signal in the second format and a second outbound telecommunications signal in the second format, the matrix interface unit operable to select any one of the first and second outbound telecommunications signals having the second format;
a transceiver framer operable to generate an outbound telecommunications signal in the first format from a selected one of the first and second outbound telecommunications signals having the second format;
a line interface unit operable to transport the outbound telecommunications signal to a telecommunications network element.

* * * * *